United States Patent [19]

Kenney

[11] 4,294,730

[45] Oct. 13, 1981

[54] GELLED LUBRICANT COMPOSITION FOR RUN-FLAT TIRES COMPRISING POLYBUTENE ACRYLIC OR POLYOLEFIN GELLING AGENT AND PARTICULATE SOLID PUNCTURE SEALING MATERIAL

[75] Inventor: Michael J. Kenney, Sutton Coldfield, England

[73] Assignee: Dunlop Limited, England

[21] Appl. No.: 81,158

[22] Filed: Oct. 2, 1979

Related U.S. Application Data

[62] Division of Ser. No. 766,679, Feb. 8, 1977.

[30] Foreign Application Priority Data

Feb. 13, 1976 [GB] United Kingdom ................. 5674/76
Oct. 15, 1976 [GB] United Kingdom ............... 42864/76

[51] Int. Cl.$^3$ .............................................. C08L 1/02
[52] U.S. Cl. .................... 260/17.4 BB; 152/330 L; 152/347; 260/17.4 R
[58] Field of Search ................................. 260/17.4 BB

[56] References Cited

U.S. PATENT DOCUMENTS

| | | | |
|---|---|---|---|
| Re. 28,587 | 10/1975 | Powell et al. ...................... 152/330 |
| 2,827,098 | 3/1958 | Semegen et al. ................... 152/347 |
| 3,042,098 | 7/1962 | Reinowski et al. ................ 152/347 |
| 3,361,698 | 1/1968 | Pace ................................... 260/30.8 |
| 3,676,381 | 7/1972 | Silverstein ......................... 260/17.4 |
| 3,881,537 | 5/1975 | Miyazato ............................ 152/347 |
| 3,909,463 | 9/1975 | Hartman ............................. 260/2.5 F |
| 3,920,061 | 11/1975 | Japp et al. ...................... 152/330 RF |
| 3,935,893 | 2/1976 | Stang et al. ...................... 152/347 |
| 3,952,787 | 4/1976 | Okado et al. ...................... 152/347 |
| 3,987,833 | 10/1976 | Powell .............................. 152/347 |
| 4,051,884 | 10/1977 | Bourne et al. ................... 152/330 L |
| 4,057,090 | 11/1977 | Hoshikawa ........................ 152/347 |
| 4,096,898 | 6/1978 | Messerly et al. ............... 152/330 L |
| 4,116,895 | 9/1978 | Kageyama et al. ................ 152/347 |

FOREIGN PATENT DOCUMENTS

| | | |
|---|---|---|
| 48511 | 5/1973 | Japan . |
| 14881 | 1/1926 | Netherlands ....................... 152/347 |
| 878681 | 10/1961 | United Kingdom . |
| 1246278 | 9/1971 | United Kingdom . |
| 1359467 | 7/1974 | United Kingdom . |
| 1359468 | 7/1974 | United Kingdom . |
| 1440186 | 6/1976 | United Kingdom . |
| 1443929 | 7/1976 | United Kingdom . |
| 1444347 | 7/1976 | United Kingdom . |
| 1532216 | 11/1978 | United Kingdom . |

*Primary Examiner*—Edward M. Woodberry
*Attorney, Agent, or Firm*—Stevens, Davis, Miller & Mosher

[57] ABSTRACT

Compositions for application to the interior surface of the tread of a pneumatic tire to facilitate relative movement between contacting portions of the interior surface when the tire is driven deflated, comprise a polybutene, an acrylic polymer or a polyolefin as a gelling agent for the polybutene, and a particulate solid puncture sealing material. Preferred gelling agents are polyethylenes, especially a mixture of high density and low density polyethylenes. Examples of suitable puncture sealing materials are rubber crumb and wood flour.

14 Claims, 1 Drawing Figure

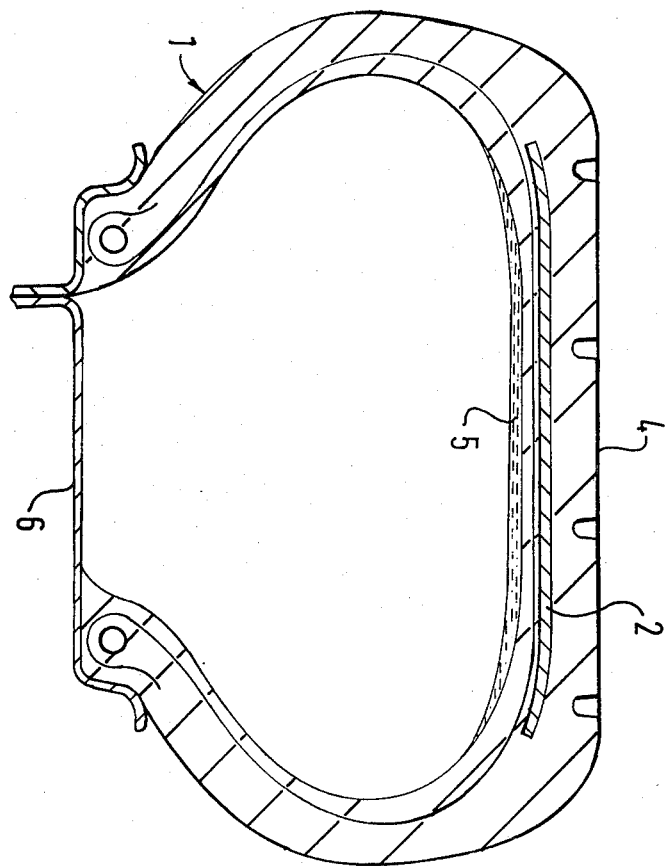

GELLED LUBRICANT COMPOSITION FOR RUN-FLAT TIRES COMPRISING POLYBUTENE ACRYLIC OR POLYOLEFIN GELLING AGENT AND PARTICULATE SOLID PUNCTURE SEALING MATERIAL

This application is a division of application Ser. No. 766,679, filed Feb. 8, 1977.

This invention relates to a pneumatic tyre capable of running to a useful extent even when the tyre is deflated.

U. K. Pat. No. 1,359,468 describes and claims a pneumatic tyre which, when mounted on a wheel rim for which it is designed and inflated to its normal working pressure, has an aspect ratio of between 30 and 75% and a tread portion whose width is greater than the width between the bead heels, having a coating of a lubricating material disposed on at least a portion of its interior surface to facilitate a relative movement between contacting portions of the interior surface of the tyre when the tyre is used in a deflated condition.

The tyre thus described marked a new step forward in the field of safety tyres. Hitherto many attempts had been made to provide an assembly which could cope with the problem of punctures to eliminate danger or vehicle immobilization; these earlier attempts being centred primarily around two approaches. One of these was to provide a safety member in the form of a second inflation chamber, special filling, or a rigid saddle onto which the tyre was supported when deflated, and the other was to provide a puncture sealing layer on the inside of the tyre to prevent the tyre from becoming deflated. The problem of the latter approach is that unless the sealing layer is 100% efficient in preventing air-loss there is a danger that some air will be lost before the puncture seals, resulting in an under-inflated tyre without the driver being aware that something was wrong. This, with a conventional tyre, can be more dangerous than a puncture since extended running at high speed on an under-inflated tyre is a prime cause of blow-outs on fast roads, and the necessary 100% efficiency is, in practice, a very elusive goal.

The concept of allowing a tyre to run deflated without extra supports enables various other possibilities to be introduced. Thus in U.K. Pat. No. 1,359,467 the present applicants describe the use of a tyre and wheel rim asembly with a liquid lubricant containing a volatile component and a puncture sealing material so that a puncture can be sealed and a low pressure generated in the tyre by evaporation of the volatile liquid. The concept of puncture sealing by this means is developed further in U.K. Pat. Application Nos. 20,502/72 and 40,823/72 (cognate) wherein the volatiles are enclosed and a gelled lubricant is coated on the tyre interior, solid puncture sealing materials being carried by the gel. In this instance release of the volatiles when the tyre deflates is followed by breakdown of the gel and mobilization of the puncture sealing materials to seek out and seal the puncture. Lubricant gels suitable for use in this system are described in U.K. Pat. application Nos. 40,824/72 and 52,342/74 and 34,509/75 (cognate).

It is to be appreciated that the purpose of the puncture sealing and vapour inflation in these instances is not to totally reinflate the tyre but simply to provide a low inflation pressure of the order of 1 to 5 psi in the tyre to reduce its deflection and thus the heat generated in running the tyre without inflation pressure. This, of course, is a quite different problem from that of the puncture sealing layers and materials of past proposals, since the latter have failed if they allow the tyre pressure to fall by more than a very few psi.

The present invention proposes a new approach to the problem of providing a low inflation pressure to reduce the deflection of a deflated, internally lubricated run-flat tyre.

It has now been found that the provision in a tyre of a puncture sealing layer capable of retaining an inflation pressure of the order of 1 to 5 psi when a puncture occurs permits deflated running of the tyre without the need for the volatile liquids and liquid lubrication system.

Thus, according to the present invention a pneumatic tyre has a coating of a lubricating material disposed on at least the interior surface of the tread to facilitate relative movement between contacting portions of the interior surface of the tyre when the tyre is driven deflated, said coating not being capable of flowing away from the portion of the interior surface to which it is applied either under gravity or under the forces generated inside a tyre during inflated running, said coating comprising a gelled non-volatile lubricant having mixed intimately therein a particulate solid puncture sealing material in an amount of at least 0.15 mm$^3$ per mm$^2$ of tyre interior surface coated, the particles of said material being of sizes distributed in a range extending from particles passing through a 7 mesh B.S. screen and retained on a 10 mesh B.S. screen to particles which will pass through a 150 micron aperture sieve, the volume of particulate solid material being at least 8% and no more than 66% of the total volume of said coating.

The gelled non-volatile lubricant may be formed from a wide range of classes of compounds which include lubricants for rubber to rubber interfaces, for example:

| | | |
|---|---|---|
| (i) | Alcohols, monohydric | e.g. n-octanol |
| | dihydric (diols, glycols) | e.g. ethylene glycol, diethylene glycol, and propylene glycol |
| | trihydric (triols) polyhydric (polyols) | e.g. glycerol |
| (ii) | Polyalkylene glycols (Generalised formula: $RO-CH_2-CH(R^1)-O-R^{11}$ where R, $R^1$ and $R^{11}$ are alkyl groups or H) | e.g. polythylene glycols and polypropylene glycols of various molecular weights |
| (iii) | Poly(alkylene oxides) | e.g. copolymers of ethylene oxide and propylene oxide units available under the trade names "Ucon 50-HB-2000", "Ucon 50-HB-3520", "Ucon 50-HB-5100" and "Ucon 50-HB-250" |
| (iv) | Polybutenes | |

Where the gelled lubricant comprises a poly(alkylene oxide) or modified poly(alkylene oxide) the gel may be made by any suitable methods, for instance the addition of finely divided fillers, especially those with colloidal dimensions (200°–500° A.) in the form of spheres, rods or platelets to the lubricant fluid. This causes a three-dimensional structure to be formed. The three-dimensional network may be mechanically strengthened by the addition of additives (e.g. sodium carbonate, or hexamethylene diamine).

The inert filler may be organic or inorganic in kind and includes silicates in the form of platelets (clays, micas, etc.) rods, fibres (asbestos), or fine particle silica, e.g. aerosil.

In preparing these gells intensive mixing techniques may be used e.g. ultra-high speed mixers, paint mills, ultrasonic stirring. The gel may also be formed using an acrylic polymer as gelling agent. An acidic emulsion of an acrylic copolymer containing carboxyl groups is added to the lubricant, e.g. ethylene glycol or glycerol, to form a mobile mixture into which puncture sealing solids can be blended. This mixture is neutralised e.g. with ammonia or sodium hydroxide solution to destroy the emulsion so that the acrylic copolymer goes into solution to produce a viscous gel. A suitable gel may also be formed using a polybutene as the lubricant and gelling it with a polyolefine, e.g. polyethylene. Preferably this polybutene gel includes an elastomer soluble in polybutene such as butyl rubber, ethylene-propylene rubber or natural rubber.

In the present invention the lubricant layer has a puncture sealing capability which is sufficient to seal or partially seal a puncture in the tread of the tyre against a low pressure, thus providing a low inflation pressure in the tyre during deflated running which will reduce the deflection of the tyre in this condition and thus reduce heat build-up in the tyre.

The tyre is preferably a radial ply construction comprising a radial ply carcass and a circumferential tread reinforcement. The tread preferably has a substantially flat profile both externally and internally, the latter being preferred since in a tyre with a deeply dished interior profile, the very high centrifugal forces generated in fast running will tend to fling material to the centre of the tread and a very thick coating of the lubricant material is required to "fill the dish" and prevent migration of the coating away from the interior surface of the tyre adjacent the edges of the tyre tread. For sufficient stability not to flow around the tyre under running conditions and under gravity the gelled lubricant preferably has a viscosity of at least 2000 N sec/$M^2$ at 20° C.

Preferably the sidewalls of the tyre are thickened to reduce their radius of curvature during the deflections suffered in deflated running of the assembly e.g. as described in U.K. Pat. application No. 48,981/73.

The particulate solid puncture sealing material preferably has a density in the range of 0.8 to 1.5 gm/cc, a particularly suitable material being rubber crumb and wood flour (sawdust).

It will be appreciated that in the assembly of this invention the puncture sealing layer of gelled lubricant functions to seal punctures in the tread of the tyre by virtue of particles of the solid material being carried into a puncture with the gel. For this reason the gel must not, of course, be rigid, but must be capable of some flow and the distribution of particulate material must be even around the tyre.

If desired the gelled lubricant may also contain a volatile liquid, such as water, which will generate a vapour pressure in the tyre after puncture sealing during deflated running.

The invention will now be described in more detail by means of the following examples.

EXAMPLE 1

Gel PSG 32 was prepared by mixing the following ingredients in the order given:

| | | |
|---|---|---|
| Gel B.308/2 | (a) | 80 gms |
| Water | | 60 gms |
| Gel 3 | (b) | 60 gms |
| 10 mesh rubber crumb | | 160 160 gms |
| | | 360 gms | of which:

(a) Gel B. 308/2 was a gel made up as follows:

| | |
|---|---|
| Ucon 50 HB - 2000 Y3 Y24 | 318 K gms |
| Water | 7 K gms |
| Aerosil 300 | 30 K gms |
| Sodium Chloride | 42 gms | and (b) Gel 3 was a gel made up as follows:

| | | |
|---|---|---|
| Acrylic emulsion Texicryl 13-1300 | | 37.5 gms |
| Water | | 157.3 gms |
| .880 ammonia | 2.6 | 5.2 gms |
| Water | 2.6 | 200.0 gms |

Four equally spaced holes were drilled in the centre crown of a 155/65-310 radial ply failsafe tyre to give, as close as possible, a leak rate of 50 ccs of air per second at a tyre pressure of 5 psi. The holes were plugged with 1½″ round nails and the 360 gms of gel PSG 32 uniformly coated round the crown of the tyre. The tyre was then fitted to its rim, inflated and fitted on a 1275 GT Mini car and driven for 90 miles at speeds up to 70 mph to smoothen out the gel and move it into a position of equilibrium. Immediately after the drive the wheel was removed from the car and balanced, after two hours the balance was checked and showed that there was no movement of the gel in the stationary tyre. The wheel was re-fitted to the car and taken to the test road where one nail was removed from the tyre and the car immediately accelerated up to 50 mph and driven at this speed for 1.6 miles when it was stopped and the puncture tested. It was found to have sealed completely with the tyre pressure remaining greater than 15 psi. The car was then driven for a further 5.8 miles and the puncture again tested. No leak was detected. A second nail was removed and the above series of tests repeated. The result was the same as the first test with the puncture sealing within 1.6 miles. The third and fourth nails were removed with the same result. At the end of the series of tests the tyre pressure had fallen to 15 psi.

EXAMPLE 2

Gel PSG 49 was prepared by mixing the following ingredients in the order given:

| | | |
|---|---|---|
| Castor Oil | } with heat | 115.5 gms |
| Gelled Castor Oil | | 26.7 gms |
| Antioxidant | | 0.9 gms |
| Water | | 35.5 gms |
| Bactericide | | 0.4 gms |
| 10 mesh rubber crumb | | 142.0 gms |
| 40 mesh rubber crumb | | 35.5 gms |

| | |
|---|---|
| Aerosil 300 | 3.5 gms |
| | 360.0 gms |

As in Example 1 a 155/65-310 tyre was prepared with four equally spaced 50 cc/sec holes in the centre crown.

Additionally the drop in pressure through one hole was measured as follows:

| Time | Pressure |
|---|---|
| 0 | 25 psi |
| 15 secs | 20 psi |
| 30 secs | 15 psi |
| 45 secs | 11 psi |
| 1 min | 8 psi |
| 2 mins | less than 2 |

The holes were plugged with 1½" round nails, the gel coated round the crown of the tyre and run on the road to smooth out the gel as described in Example 1. The wheel was removed from the car and put in an oven for two hours at 100° C. to simulate the effect of a low bake oven on the tyre and gel.

At the end of the period in the oven the tyre was removed from the rim and the gel inspected. The heat had no visible effect on the gel and the tyre was re-fitted to the rim and road tested with the following results:

| Test | Miles at 50 mph | Tyre Pressure |
|---|---|---|
| — | 0 | 24½ psi |
| Nail A Removed | 1.7 | 21 psi |
| — | 7.5 | 21½ psi |
| Nail B Removed | 1.7 | 11 psi |
| — | 7.5 | 12¼ psi |
| Nail C Removed | 1.7 | 3¾ psi |
| — | 7.5 | 4½ psi |
| Car stationary. Tyre allowed to cool for 15 minutes | | 3 psi |
| Nail D Removed | 0 | 0 psi |
| | 1.7 | 2 psi |
| | 6.0 | 2 psi |
| | 13.6 | 3¼ psi |
| | 21.0 | 3½ psi |

Thus even when nail D had been removed and the pressure allowed to fall to zero, after driving for 1.7 miles the puncture had sealed and the pressure in the tyre had risen to 2 psi and eventually to 3½ psi after 21 miles.

EXAMPLE 3

Gel PSG 51 was prepared by mixing the following ingredients in the order given:

| | |
|---|---|
| Ethanediol | 150 gms |
| Viscalex HV.30 (an emulsion of carboxylated acrylic copolymer manufactured by Allied Colloids Limited) | 25 gms |
| Water | 25 gms |
| 10 mesh rubber crumb | 125 gms |
| 40 mesh rubber crumb | 25 gms |
| 880 ammonia 5 } Water 5 | 10 gms |
| | 360 gms |

The Viscalex HV-30 and water were added to the ethanediol to form a mobile mixture to which the rubber crumb puncture sealing solids are added. The mixture was then neutralised with ammonia solution to destroy the emulsion causing the acrylic copolymer to go into solution to form the gel.

The 360 gms of gel was uniformly coated in a 155/65-310 tyre with four equally spaced 50 cc/sec holes in the centre crown as described in the previous Examples and run on the road for 33 miles at speeds up to 70 mph to smooth out the gel. The nail plugs were then removed in turn as described in the previous Examples with the following results:

| Test | Miles at 50 mph | Tyre Pressure |
|---|---|---|
| — | 0 | 30 psi |
| Nail A Removed | 1.7 | 28 psi |
| Nail C Removed | 2.0 | 27 psi |
| Nail D Removed | Tyre allowed to fully deflate before driving off | 0 psi |
| | 2.5 | 2½ psi |
| | 6.0 | 3½ psi |

Note:
(a) During this test the road was wet but it was not raining at the time.
(b) Nail B could not be removed.

The wheel was removed from the car, re-inflated to 25 psi and put in an oven for two hours at 100° C. After it had cooled it was put back on the car and re-tested on the road with the following results:

| Test | Miles at 50 mph | Tyre Pressure |
|---|---|---|
| — | 0 | 26 psi |
| Nail A Removed | 1.7 | 21½ psi |
| — | 7.5 | 22½ psi |
| Nail C Removed | 1.7 | 12 psi |
| — | 7.5 | 13 psi |
| Nail D Removed | Tyre allowed to fully deflate before driving off | 0 psi |
| | 1.7 | 1¾ psi |
| | 6.0 | 2½ psi |

Thus this experiment repeated the results of the previous experiments showing that a wide variety of gels can be made to successfully seal punctures. Also a tyre which has fully deflated through a puncture on a stationary car will readily generate pressure on driving off.

EXAMPLE 4

Three carboxylated acrylic copolymer gels using glycerol and diethylene glycol as the lubricant, were prepared by mixing the ingredients in the order given in a similar manner to that used in the preparation of Gel PSG 51 in Example 3.

| | | | |
|---|---|---|---|
| (A) | Glycerol | 80 | gms |
| | Viscalex HV.30 | 6 | gms |
| | 10 mesh rubber crumb | 35 | gms |
| | 40 mesh rubber crumb | 7 | gms |
| | 370 sodium hydroxide solution | 12 | gms |
| | | 140 | gms |
| (B) | Diethylene Glycol (Digol) | 80 | gms |
| | Viscalex HV.30 | 22 | gms |
| | Water | 10 | gms |
| | 20 mesh rubber crumb | 30 | gms |
| | 40 mesh rubber crumb | 6 | gms |
| | .880 ammonia solution | 2.5 | gms |
| | Ucon 50 HB 260 (defoaming agent) | 2 | gms |
| | | 152.5 | gms |

-continued

|     |                         |       |     |
| --- | ----------------------- | ----- | --- |
| (C) | Glycerol                | 80    | gms |
|     | Viscalex HV.30          | 7.5   | gms |
|     | Water                   | 7.15  | gms |
|     | Ucon 50 HB 260          | 10    | gms |
|     | 20 mesh crumb           | 40    | gms |
|     | 40 mesh crumb           | 8     | gms |
|     | 3% sodium hydroxide solution | 14 | gms |
|     |                         | 166.3 | gms |

The Ucon 50-HB-260 was added to improve the lubricity of the gel and its sprayability when applied to the tyre by a spray process.

EXAMPLE 5

The inner crown of a current 155/65-310 failsafe radial ply tyre is slightly dished. The gelled lubricant moves under the high radial forces in the rotating tyre to form a pool of gel in the dished crown, the centre of which is substantially deeper than the edges. Clearly then the width of the gel across the crown is dependent on the volume of gel in the tyre and the shape of the surface of the inner crown.

The following experiment to determine the effective puncture sealing width of the gel was conducted with a standard production 155/65-310 failsafe tyre. Six equally spaced standard size punctures were put into the tread ribs as follows:
Puncture A 20 mm from tread centre—left hand side
B 37½ mm from tread centre—left hand side
C 50 mm from tread centre—left hand side
D 20 mm from tread centre—right hand side
E 37½ mm from tread centre—left hand side
F 50 mm from tread centre—left hand side The tyre was fitted to a rim and the puncture rates recorded as follows, 1½" round nails being used to plug as necessary.

| Time    | A       | B       | C            | D       | E       | F       |
| ------- | ------- | ------- | ------------ | ------- | ------- | ------- |
| 0       | 30 psi  | 30 psi  | 30 psi       | 30 psi  | 30 psi  | 30 psi  |
| 15 secs | 28½ psi | 28½ psi | 29 psi       | 27½ psi | 29 psi  | 28½ psi |
| 30 secs | 27 psi  | 27½ psi | 27½ psi      | 26 psi  | 28 psi  | 27 psi  |
| 34 secs | 25½ psi | 26½ psi | 26¼ psi      | 24 psi  | 27¼ psi | 25½ psi |
| 1 min   | 24 psi  | 25 psi  | 25 psi       | 22 psi  | 26¼ psi | 24 psi  |
| 2 mins  | 19½ psi | 21 psi  | 21 psi       | 16 psi  | 23 psi  | 19¼ psi |
| 4 mins  | 11½ psi | 14 psi  | not          | 7 psi   | 18 psi  | 11½ psi |
| 8 mins  | 4 psi   | 5½ psi  | measured     | 0 psi   | 11 psi  | 3½ psi  |

The tyre was removed from the rim and with all the holes plugged by 1½" round nails the inner centre crown was uniformly coated with 400 gms of Gel PSG 55 formulated as follows:

|                  |           |
| ---------------- | --------- |
| Ethanediol       | 165.0 gms |
| Viscolex HV.30   | 27.5 gms  |
| Water            | 33.0 gms  |
| 10 mesh crumb    | 137.5 gms |
| 40 mesh crumb    | 27.5 gms  |
| 880 ammonia 5.5  | 11.0 gms  |
| Water 5.5        |           |
|                  | 401.5 gms |

It was re-fitted to the rim, inflated to 25 psi and driven on the road for 55 miles at speeds up to 70 mph to smooth out the gel. The nail plugs were then removed in turn as described in the previous examples with the following results:

| Test             | Miles at 50 mph                                      | Tyre Pressure |
| ---------------- | ---------------------------------------------------- | ------------- |
|                  | 0                                                    | 23 psi        |
| Nail A Removed   | 1.7                                                  | 21 psi        |
|                  | 7.5                                                  | 20 psi        |
| Nail D Removed   | 1.7                                                  | 19 psi        |
|                  | 7.5                                                  | 19 psi        |
| Nail B Removed   | 1.7                                                  | 18 psi        |
|                  | 7.5                                                  | 18 psi        |
| Nail E Removed   | 1.7                                                  | 17 psi        |
|                  | 7.5                                                  | 18 psi        |
| Nail C Removed   | 1.7                                                  | 10 psi        |
|                  | 7.5                                                  | 5 psi         |
|                  | 25.5                                                 | 3½ psi        |
|                  | Car stationary and tyre allowed to cool for 15 minutes | 0 psi       |
|                  | 33.0                                                 | 2 psi         |
|                  | 35.4                                                 | 1¼ psi        |
|                  | Car stationary and tyre allowed to cool for 1 hour   | 0 psi         |
|                  | 48.4                                                 | 1¼ psi        |
|                  | 65.2                                                 | 1¼ psi        |
|                  | 82.0                                                 | 1 psi         |
|                  | 85.8                                                 | ½ psi         |
|                  | 91.7                                                 | 0 psi         |

The wheel and tyre was removed from the car and reinflated to 30 psi with nails A, D, B, E and C still removed from the tyre and these punctures tested for leaks. Only puncture C was leaking air, the other punctures i.e. two at 20 mm and two at 37½ mm from the tread centre had sealed against the full 30 psi tyre pressure.

The leak rate of puncture C (50 mm from the tread centre) was measured as follows:

| Time    | Pressure |
| ------- | -------- |
| 0       | 30 psi   |
| 15 secs | 29½ psi  |
| 30 secs | 29 psi   |
| 45 secs | 28½ psi  |
| 1 min   | 28 psi   |
| 2 mins  | 26 psi   |
| 4 mins  | 22¾ psi  |
| 8 mins  | 17½ psi  |
| 15 mins | 10¾ psi  |
| 30 mins | 6 psi    |

Comparing this with the original leak rate of puncture C it is seen that there was a considerable reduction in leak rate. This was probably due to the way in which the holes were made in the tyre by burning them through with white-hot wire. This would undoubtedly leave the hole lined with degraded rubber which, it is easy to visualise, could partly seal the hole as it was constantly flexed and squeezed by the flat tread and breaker. Nevertheless this does not detract from the fact that after the tyre was allowed to cool and go quite flat it was possible to generate a pressure of more than 1 psi for more than 30 miles at 50 mph relying solely on water vapour and hot air generation. The indications are that had the tyre been allowed to cool for a time and regenerate itself with cold air a further similar mileage could have been recorded and this with an unsealed puncture. This could not be checked because of severe secondary damage in the inner sidewall caused by nail F.

EXAMPLE 6

Gel PSG 60B was prepared by mixing the following ingredients in the order given:

| | | |
|---|---|---|
| Gel B.308/2 | 100 | gms |
| Water | 5 | gms |
| 10 mesh rubber crumb | 50 | gms |
| 40 mesh rubber crumb | 10 | gms |
| | 165 | gms |

The 155/65-310 tyre used in Examples 1, 2 and 3, was cleaned out and the holes plugged with 1½" nails. 360 gms of Gep PSG 60B was uniformly coated round the crown of the tyre which was then fitted to a rim inflated to 25 psi and run on a drum for 30 minutes at 70 mph to smooth out the gel and move it into a position of equilibrium. The tyre was then aged for 3 days in an oven controlled at 70° C. before fitting to a car and road testing with the following results:

| Test | Miles at 50 mph | Tyre Pressure |
|---|---|---|
| — | 0 | 26 psi |
| Nail A Removed | Delay of approx. 15 seconds due to road traffic then | |
| | 1.7 | 3 psi |
| | 14.0 | 3¼ psi |
| Tyre reinflated to 25 psi. Puncture A | | |
| — | 0 | 19 psi |
| Nail B Removed | 1.7 | 6¼ psi |
| — | 7.5 | 6¾ psi |
| Nail D Removed | 1.7 | 3½ psi |
| | 6.0 | 3½ psi |

The leak rates of the punctures seemed to have increased since Example 1. Puncture A was measured as follows:

| Time | Pressure |
|---|---|
| 0 | 30 psi |
| 15 secs | 14 psi |
| 30 secs | 6 psi |
| 45 secs | 2 psi |

Comparing this with the leak rate measured in Example 2 it will be seen that the observations were confirmed.

Thus Gel PSG 60B even after ageing for three days at 70° C. efficiently sealed three test punctures with a leak rate greater than 90-95% of all naturally occurring tyre punctures.

In the foregoing examples the particle size distribution of rubber crumb used was as follows:

| | | |
|---|---|---|
| (a) | 10 mesh | |
| | Retained on 7 mesh B.S. screen (aperture 2.36 mm) | 1% max |
| | Passing 7 mesh, retained on 10 mesh (aperture 1.70 mm) | 25% max |
| | Passing 10 mesh, retained on 14 mesh (aperture 1.18 mm) | 20-50% |
| | Passing 14 mesh, retained on 18 mesh (aperture 850 microns) | 5-25% |
| | Passing 18 mesh, retained on 22 mesh (aperture 710 microns) | 5-15% |
| | Passing 22 mesh, retained on 36 mesh (aperture 425 microns) | 5-25% |
| | Passing 36 mesh | 5-20% |
| (b) | 40 mesh | |
| | Retained on 420 micron sieve | 1% max |
| | Passing 420 micron retained on 250 micron aperture sieve | 40-60% |
| | Passing 250 micron retained on 180 micron aperture sieve | 20-30% |
| | Passing 180 micron retained on 150 micron aperture sieve | 5-15% |
| | Passing 150 | 10-20% |

In the gel used in Example 5 above 131 gms of rubber crumb of density 1.18 gm/ml were used in 360 gms of gel/crumb mix of density 1.104 gm/ml. The internal surface area of the tyre coated was approximately 110 mm wide, the total surface area coated being 161,200 mm$^2$.

Thus, in the Example, the rubber crumb made up 34.1% by volume of the gel/crumb mix and there were 0.689 mm$^3$ of crumb in the tyre per mm$^2$ of tyre surface area coated.

Tests have shown that below a certain ratio of rubber crumb to gel the efficiency of the sealant is reduced to an unacceptable level. Using a standard test puncture consisting of a clean hole burned through the tread region of a tyre having an air leak rate of 50 ccs/sec at 5 psi tyre pressure, our tests show that the ratio of rubber crumb to gel medium should not be less than the following to ensure efficient puncture sealing with a 3 mm thick puncture sealing layer at the tyre crown in a 155/65-310 failsafe tyre.

| | | |
|---|---|---|
| Gel B.308/2 | 118 | gms |
| 10 mesh rubber crumb | 12.3 | gms |
| 40 mesh rubber crumb | 1.46 | gms |
| Water | 5.00/ gms | |
| | 141.00 | gms |

Overall density of gel/crumb mix = 1.08 gm/ml.

In this Example the rubber crumb made up 8.94% by volume of the rubber crumb/gel mix, and there were 0.185 mm$^3$ of crumb per mm$^2$ of tyre surface area in the tyre. It will be appreciated that the last figure is only intended as a broad guide since the actual distribution of the coating, which is thicker in the centre crown region, means that there will be a lower actual ratio of crumb volume to tyre surface area beneath the tread edges.

EXAMPLE 7

A gelled polybutene sealant composition was prepared by mixing the following ingredients:

| | |
|---|---|
| Hyvis 30 (a polybutene manufactured by B.P. Chemicals Limited) | 90 gms |
| AC 6 (low molecular weight polyethylene manufactured by Allied Chemicals Limited) | 10 gms |
| 30 mesh rubber crumb | 30 gms |
| | 130 gms |

The Hyvis 30 was heated to about 130° C. and the AC 6 added and stirred until the liquid was clear and mobile. The rubber crumb was then stirred in and stirring continued until the temperature had fallen to below 100° C. to ensure that the crumb did not settle out. The composition thus made was tested and found to be stable on a vertical aluminium surface at temperatures up to 98° C. after which it began to slump and eventually, at a temperature of 103° C., to flow freely. At a temperature of about 120° C. the composition was fluid and mobile, similar to a water slurry, and continuous stirring was necessary to ensure that the crumb did not settle out. A spray test showed that provided the composition was maintained at 120° C. and the spray gun was heated to about 110° C. the composition could readily be sprayed onto the inner layer of a tyre.

A puncture sealing experiment was then carried out using a 155/65-310 radical ply failsafe tyre.

Four equally spaced punctures were burned in the centre rib of the tyre with red-hot wire and the leak rate of each puncture measured by inflating the tyre to 30 psi and noting the loss of pressure with time as follows:

| Time | Pressure psi | | | |
|---|---|---|---|---|
| | Puncture A | Puncture B | Puncture C | Puncture D |
| 0 | 30 | 30 | 30 | 30 |
| 15 secs | 28½ | 28¼ | 25½ | 23 |
| 30 secs | 27¼ | 27 | 21½ | 18½ |
| 45 secs | 25½ | 26 | 18½ | 15 |
| 1 min | 24¼ | 25 | 15½ | 12 |
| 2 mins | 20¼ | 21 | 7½ | 4¾ |
| 3 mins | 17 | 18 | 3 | 1¼ |
| 4 mins | 13¾ | 15 | 1 | 1 |
| 5 mins | 11½ | 12¾ | | |
| 6 mins | 9 | 11 | | |
| 8 mins | 6 | 7½ | | |
| 10 mins | 4 | 5¼ | | |
| 12 mins | 2¼ | 3¼ | | |
| 14 mins | 1¼ | 2½ | | |
| 16 mins | 1 | 1½ | | |
| 18 mins | | 1 | | |

300 gms of the above gelled polybutane sealant composition was heated to 130° C. and hot sprayed onto the inner crown and shoulder of the tyre in a uniform coating 2 mm thick. At 130° C. the composition was very fluid and sprayed without difficulty through a conventional air spray gun but below 100° C. it gelled to a stiff stable coating on the tyre. The composition had probably cooled and gelled immediately after being atomised by the spray gun but this was not important because the thicky nature of the gelled composition enabled a coherent coating to be built up on the tyre inner crown and shoulder.

In order to plug the punctures in the tyre and simulate puncturing objects ordinary 1½″ round wire nails were inserted into the punctures. The tyre was then fitted to a rim and with the internal pressure set at 5 psi each nail was removed in turn and the punctures tested with a soap solution to see if the mere act of removing the nail would draw the puncture sealant into the hole and seal the puncture. In fact none of the four punctures sealed even at this low pressure.

The nails were re-inserted into the tyre to plug the puncture and with the internal pressure set at 30 psi the wheel was run on a drum for 15 minutes at a speed of 60 mph under a nominal load. Tests were then carried out on the punctures as follows:

(a) the tyre pressure was reduced to 5 psi and the nail was removed from puncture A—the puncture did not seal. The wheel was then run for a further 5 minutes at a speed of 50 mph after which it was found that the puncture had sealed with the pressure at 3 psi. The tyre was re-inflated to 26 psi and the puncture remained sealed.

(b) with the tyre pressure at 26 psi the nail was removed from puncture B—the puncture did not seal. The wheel was then run for a further 5 minutes at a speed of 50 mph after which it was found that the puncture had sealed with the pressure at 23 psi. The tyre pressure was increased to 35 psi and both punctures A and B remained sealed.

(c) with the tyre pressure at 30 psi the nail was removed from puncture C—the puncture did not seal. The wheel was then run for a further 5 minutes at a speed of 50 mph after which it was found that the puncture had sealed with the pressure at 4 psi. The tyre was re-inflated to 28 psi and the puncture remained sealed for approximately one minute when the seal broke. Puncture C was re-plugged with a nail.

(d) with the tyre pressure at 26 psi the nail was removed from puncture D—the puncture did not seal. The wheel was then run for a further 5 minutes at a speed of 50 mph after which it was found that the puncture had sealed at 8 psi. The test was concluded at this point. Five hours later the tyre pressure remained at 8 psi.

It will be appreciated from this test that rotation of the wheel was necessary to move the sealant composition into the puncture.

EXAMPLE 8

Gel PSG 132 was prepared by mixing the following ingredients in the order given by simple stirring at ambient temperature.

| | Parts by weight |
|---|---|
| Hyvis 10 (a polybutene manufactured by B.P. Chemicals Limited) | 94 |
| Aerosil 300 (Silica) | 6 |
| Triethylamine | 1 |
| 20 mesh rubber crumb | 35 |
| | 136 |

The mixture was heated to 120° C. and 350 gms uniformly sprayed into the inner crown region of a 155/65-310 radial ply failsafe tyre. Although the mixture was stable against vertical flow for temperatures up to at least 150° C. the effect of heating it to 120° C. was to soften it and make spray application to the tyre easier and more satisfactory from the point of view of directing the spray and making the application more uniform.

The tyre was then mounted on a wheel and subjected to a machine test at 80 mph at 500 lbs load after which the balance and uniformity of the tyre was found to be materially unaffected and the gel quite stable.

Additionally samples of the mixture were tested (a) In an oven at 80° C. when the mixture was unchanged after a period of two weeks.
(b) In an oven at 120° C. when no vertical flow of the mixture occurred after a period of 24 hours.
(c) In a centrifuge, diameter 19 inches and speed 3000 rpm when insignificant separation of the mixture was noted after a period of 8 hours. In this test the temperature attained at 45° C. within the centrifuge.

EXAMPLE 9

Gel PSG 133 was prepared by mixing the following ingredients in the order given by simple stirring at 130° C.:

| | Parts by weight |
|---|---|
| Hyvis 10 (a polybutene manufactured by B.P. Chemicals Limited) | 85 |

| | Parts by weight |
|---|---|
| AC 8 (A low density polyethylene manufactured by Allied Chemicals Limited) | 9 |
| | 94 |

When the polyethylene dissolved the following were added:

| | |
|---|---|
| Aerosil 300 (Silica) | 6 |
| 20 mesh rubber crumb | 35 |
| | 135 |

The mixture was allowed to cool. Later it was reheated to 120° C. and 350 gms uniformly sprayed into the inner crown of a 155/65-310 radial ply failsafe tyre.

EXAMPLE 10

Gel PSG 141 was prepared by mixing the following ingredients in the order given by simple stirring at 130° C.

| Hyvis 10 | 92 parts by weight |
|---|---|
| AC 8 | 6 parts by weight |

When the polyethylene dissolved 4 parts by weight Aerosil 300 (Silica) and 35 parts by weight 20 mesh wood flour were added.

300 gms of this gel were hot sprayed onto the inner crown of a 155/65-310 radial ply failsafe tyre.

The addition of the fine particle silica (Aerosil 300) increased the viscosity of the composition so that even at a temperature of 130° C. it did not slump on the vertical face of a glass beaker. On the other hand the viscosity at 130° C. was sufficiently low to enable the composition to be readily sprayed onto the inner crown or tread region of a tyre.

The combination of the fibrous wood flour and granular rubber crumb was found to be a very satisfactory puncture sealant without inhibiting the sprayability of the heated composition.

When tested in the tyre it was found that at low temperatures, 10° C.-20° C., the viscosity of the composition was too great for it to flow into the puncture at 50 mph vehicle speed, but as the tyre pressure dropped the tyre rapidly warmed up and reduced the viscosity of the composition to a level such that it could flow into the puncture and seal it. For instance in one example a standard puncture was made in a cold tyre with the pressure set at 25 psi (cold here means an ambient temperature of 20° C.). The puncture did not seal when the tyre was driven at 50 mph. As the pressure dropped the tyre temperature rose and eventually the puncture sealed at a tyre pressure of 17½ psi. The temperature of the tyre had by then risen to 45° C. From then on three further standard punctures in the same tyre sealed with a maximum loss of pressure of 1 psi, i.e. the tyre was set at 25 psi before each puncture was made the pressure in the tyre after it had sealed was 24, 24½ and 24½ psi respectively.

EXAMPLE 11

Gel PSG 175 consisting of the following ingredients:

| | Parts by weight |
|---|---|
| Hyvis 10 (a polybutene manufactured by B.P. Chemicals Limited) | 94 |
| Rigidex 140/60 (a high density polyethylene manufactured by B.P. Chemicals Limited) | 2 |
| AC8 (a low density polyethylene manufactured by Allied Chemicals Limited) | 4 |
| Polysar 301 (butyl rubber) | 2 |
| 20 mesh rubber crumb | 50 |
| | 150 | was prepared by dissolving the Rigidex 140/60, AC8 and butyl rubber as a 33% solution in polybutene by stirring at 180°-190° C. The rubber crumb was then added to the hot solution and stirred while maintaining the temperature above 140° C.

350 gms of this mixture was hot sprayed at 140°-150° C. onto the inner liner of a 155/65-310 tyre to cover the tread area to a depth of 2-3 mm and when tested was found to adequately seal standard test punctures.

A tyre in accordance with the present invention will now be described by way of example with reference to the accompanying drawing which shows in section, a failsafe tyre mounted on a wheel rim.

The drawing shows a radial ply tyre 1 having a tread portion 4 braced by a breaker assembly 2. The interior of the tread portion 4 has a coating 5 of a gelled lubricant containing a puncture sealing solid material. The tyre is mounted on a two-piece wheel rim 6.

I claim:

1. A composition for application to the interior surface of the tread of a pneumatic tire to facilitate relative movement between contacting portions of the interior surface of the tire when the tire is driven deflated, said composition comprising a polybutene, an acrylic polymer or a polyolefin as gelling agent for the polybutene, and a particulate solid puncture sealing material, the particles of said puncture sealing material being of sizes distributed in a range extending from particles passing through a 7 mesh B.S. screen and retained on a 10 mesh B.S. screen to particles which will pass through a 150 micron aperture sieve, the volume of particulate solid material being at least 8% and no more than 66% of the total volume of said composition.

2. A composition according to claim 1, in which the gelling agent is polyethylene.

3. A composition according to claim 2, in which the amount of polyethylene is in the range from 6% to 10% weight of the total weight of polybutene and polyethylene.

4. A composition according to claim 2, in which the polyethylene is a mixture of high density and low density polyethylene.

5. A composition according to claim 4, in which the weight of low density polyethylene is greater than the weight of high density polyethylene.

6. A composition according to claim 1, which includes an elastomer soluble in the polybutene.

7. A composition according to claim 6, in which the elastomer is butyl rubber, ethylene-propylene rubber or natural rubber.

8. A composition according to claim 7, in which the amount of said elastomer is approximately 2% by weight of the polybutene.

9. A composition according to claim 1, which contains silica as a further gelling agent.

10. A composition according to claim 1, in which said puncture sealing material has a density in the range from 0.8 1.5 g. per cc.

11. A composition according to claim 10, in which said puncture sealing material comprises rubber crumb.

12. A composition according to claim 1, in which said puncture sealing material comprises wood flour.

13. A composition according to claim 1, in which the amount of the said puncture sealing material is in the range from 33% to 53% by weight of the polybutene.

14. A composition according to claim 1, which in the gelled state has a viscosity in the range from 2000 to 15000 N sec/M$^2$ at a shear rate of 0.3 sec$^{-1}$ and a temperature of 20° C.

* * * * *

UNITED STATES PATENT AND TRADEMARK OFFICE
CERTIFICATE OF CORRECTION

PATENT NO. : 4,294,730
DATED : October 13, 1981
INVENTOR(S) : Michael J. KENNEY

It is certified that error appears in the above—identified patent and that said Letters Patent is hereby corrected as shown below:

Column 1, line 24, "hithereto" should be -- hitherto --.

Column 2, line 45, "polythylene" should be -- polyethylene --.

Column 4, line 9, "160" (second occurrence) should be deleted.

Column 4, line 38, "smoothen" should be -- smooth --.

Column 11, line 32, "polybutane" should be -- polybutene --.

Column 11, line 41, "thicky" should be -- thick --.

*Signed and Sealed this*

*Ninth* Day of *February 1982*

[SEAL]

*Attest:*

GERALD J. MOSSINGHOFF

*Attesting Officer*     *Commissioner of Patents and Trademarks*